(12) United States Patent
Sickart et al.

(10) Patent No.: US 8,683,888 B2
(45) Date of Patent: Apr. 1, 2014

(54) SHIFT DEVICE FOR AN AUTOMATED OR AUTOMATIC TRANSMISSION

(75) Inventors: Michael Sickart, Heimsheim (DE); Michael Funk, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 792 days.

(21) Appl. No.: 12/375,322

(22) PCT Filed: Jun. 27, 2007

(86) PCT No.: PCT/EP2007/005666
§ 371 (c)(1),
(2), (4) Date: Jan. 14, 2011

(87) PCT Pub. No.: WO2008/011946
PCT Pub. Date: Jan. 31, 2008

(65) Prior Publication Data
US 2011/0138955 A1 Jun. 16, 2011

(30) Foreign Application Priority Data
Jul. 28, 2006 (DE) .......................... 10 2006 034 939

(51) Int. Cl.
*B60K 20/00* (2006.01)

(52) U.S. Cl.
USPC ................. 74/473.18; 74/473.3; 74/473.33

(58) Field of Classification Search
USPC .................. 74/473.1, 473.21–473.25, 473.3, 74/473.32, 473.33, 473.12, 473.18
See application file for complete search history.

(56) References Cited

U.S. PATENT DOCUMENTS

| | | | |
|---|---|---|---|
| 5,722,292 A * | 3/1998 | Anderson et al. ................ | 74/335 |
| 5,870,929 A * | 2/1999 | Bravo ......................... | 74/473.18 |
| 6,230,579 B1 * | 5/2001 | Reasoner et al. ........... | 74/473.18 |
| 6,443,025 B2 * | 9/2002 | Ohashi et al. ............... | 74/473.18 |
| 6,848,332 B2 * | 2/2005 | Hayashi et al. ............. | 74/473.33 |
| 6,895,833 B2 * | 5/2005 | Cho ............................ | 74/473.18 |
| 7,210,370 B2 * | 5/2007 | Giefer et .................... | 74/473.18 |

(Continued)

FOREIGN PATENT DOCUMENTS

| | | | |
|---|---|---|---|
| DE | 197 37 296 A1 | 3/1999 | |
| DE | 19737296 A1 * | 3/1999 | .............. F16H 59/08 |

(Continued)

OTHER PUBLICATIONS

International Search Report, dated Nov. 28, 2007.

*Primary Examiner* — Justin Krause
*Assistant Examiner* — Alexander Vu
(74) *Attorney, Agent, or Firm* — RatnerPrestia

(57) ABSTRACT

A shift device for an automated or automatic transmission, in particular of a motor vehicle, has a manual selector lever which can be moved into the following stable selector lever positions: P, R, N and E and into four non-stable selector lever positions. Here, the stable selector lever positions are all arranged in alignment in a shift gate. Here, a stable selector lever position E is provided which is arranged in alignment with the stable selector lever positions in the shift gate and, here, is situated between two non-stable tilt positions +/−, which are arranged in alignment with the selector lever positions P, R and N, for step-by-step or multiple shifting, and in a transverse gate, which runs transversely with respect to the shift gate, between the two non-stable selector lever positions D and M arranged in the transverse gate.

8 Claims, 3 Drawing Sheets

(56) References Cited

U.S. PATENT DOCUMENTS

| | | | |
|---|---|---|---|
| 7,322,457 B2* | 1/2008 | Giefer et al. | 192/219.4 |
| 7,530,285 B2* | 5/2009 | Rettenmaier et al. | 74/473.18 |
| 7,694,604 B2* | 4/2010 | Sickart et al. | 74/473.18 |
| 2001/0029799 A1* | 10/2001 | Ohashi et al. | 74/335 |
| 2003/0029265 A1* | 2/2003 | Wang | 74/473.21 |
| 2003/0172762 A1* | 9/2003 | Ehrmaier et al. | 74/473.33 |
| 2006/0248976 A1* | 11/2006 | Sickart et al. | 74/473.18 |
| 2011/0138955 A1* | 6/2011 | Sickart et al. | 74/473.3 |

FOREIGN PATENT DOCUMENTS

| | | |
|---|---|---|
| DE | 100 59 277 A1 | 6/2001 |
| EP | 0 718 527 A | 6/1996 |
| EP | 1 719 934 A | 11/2006 |

* cited by examiner ically simple and easy-to-operate shifting device is embodied by the four unstable selector lever positions arranged about the selector lever position E.

SHIFT DEVICE FOR AN AUTOMATED OR AUTOMATIC TRANSMISSION

CROSS REFERENCE TO RELATED APPLICATIONS

This application is the U.S. National Phase Application of PCT International Application No. PCT/EP2007/005666, filed Jun. 27, 2007, which claims priority to German Patent Application No. 10 2006 034 939.3, filed Jul. 28, 2006, each of which are incorporated by reference herein in their entirety.

FIELD OF THE INVENTION

The present invention pertains to a shifting device for an automated or automatic transmission.

BACKGROUND OF THE INVENTION

A shifting device has become known from DE 197 37 296 C2, in which the shift lever is adjustable in a shift gate, which has four stable shift positions arranged next to one another, each of which is assigned to an automatic gear of the transmission. Three unstable shift positions, one of which is embodied as a forward gear and is arranged in the shift gate, are adjacent to one of the stable shift positions lying on the outside. The two other unstable shift positions are arranged on both sides of the stable manual shift position in a transverse gate, which crosses the shift gate in the manual shift position. The two unstable shift positions of the transverse date are used to upshift and to downshift the gears. The other stable shift positions of the shift gate are an idling gear, a reverse gear and a park gear.

An object of the present invention is to provide an improved embodiment for a shifting device of the type mentioned in the introduction, which is especially characterized by a simple handling.

This object is accomplished according to aspects of the present invention by the subject of the independent claim. Advantageous embodiments are the subject of the dependent claims.

SUMMARY OF THE INVENTION

The present invention relates to the general idea of arranging a stable selector lever position E in extension to and in alignment with the positions P, R and N in the shift gate in a shifting device for an automated or automatic transmission with various stabile and unstable selector lever positions, whereby the stable selector lever position E lies at the point of intersection among a total of four unstable selector lever positions. The four unstable selector lever positions are, on the one hand, formed by two tapping positions for gradual or multiple shifting, which are arranged in alignment with the selector lever positions P, R and N, and, on the other hand, by two selector lever positions D and M, which are arranged in a transverse gate running transversely to the shift gate. The fourth stable selector lever position E thus represents a stable middle position, starting from which it is possible to switch over to D or M mode to the left or the right, respectively. The unstable upshifting or downshifting of the gears via tap shifting takes place by moving the selector levers in the P, R, N shift gate. Thus, it is possible to select four unstable selector lever positions from the selector lever middle position E by tapping into the corresponding direction. The shifting processes essential for normal driving operation, i.e., upshifting and downshifting of the forward gears, can be controlled without problems from the stable selector lever position E, whereby, moreover, it is possible to change between a manually shiftable driving operation and an automatic driving operation by a simple tapping of the selector lever. An especially simple and easy-to-operate shifting device is embodied by the four unstable selector lever positions arranged about the selector lever position E.

According to an advantageous embodiment of the solution according to the present invention, it is possible to provide that the selector lever comprises a selector shaft and a shift body which can be coupled thereto, whereby a first locking device is assigned to the selector shaft and a second locking device is assigned to the shift body. If the first locking device is unlocked, the selector shaft is uncoupled from the shift body in such a way that it is pivotable about a pivot axis. By contrast, if the first locking device is locked, the selector shaft is coupled to the shift body in such a way that it is pivotable about the pivot axis together with the shift body if the second locking device is unlocked at the same time. Consequently, both the unstable selector lever positions and the stable selector lever positions can be reliably selected with a single selector lever, whereby, depending on the position of the first or second locking device, either the selector shaft alone is moved and thus the unstable selector lever positions M, D as well as the tap shifting for upshifting and downshifting can be selected, or the stable selector lever positions E, N, R and P can be selected with the entire selector lever, i.e., the selector shaft and the shift body coupled thereto. Thus, similar shifting processes or paths arise for a driver between the unstable selector lever positions and the stable selector lever positions, so that an especially simple operatability of the shifting device according to aspects of the present invention is achieved.

According to another advantageous embodiment, it is possible to provide, for example, that a fourth arm of the shift body carries a pin, which cooperates with a locking shifting gate of a locking lever, and/or whereby an actuator is provided, which actuates the locking lever for pivoting. The actuator here locks the locking lever in the selector lever position N in the energized state, while the actuator locks the locking lever in the selector lever position P in the currentless state. Thus, a key/shift-lock shifting is provided by the actuator for the two stable selector lever positions P and N, as a result of which an effective securing against operating error can be achieved.

BRIEF DESCRIPTION OF DRAWINGS

Other important features and advantages of the present invention arise from the subclaims, from the drawings and from the related description of the figures based on the drawings.

It is understood that the features mentioned above and those still to be explained below can be used not only in the combination indicated in each case, but also in other combinations or standing alone without going beyond the scope of the present invention.

Preferred exemplary embodiments of the present invention are shown in the drawings and explained in detail in the following description, whereby identical reference numbers refer to identical or similar or functionally identical components.

In the drawings,

Figure 1:
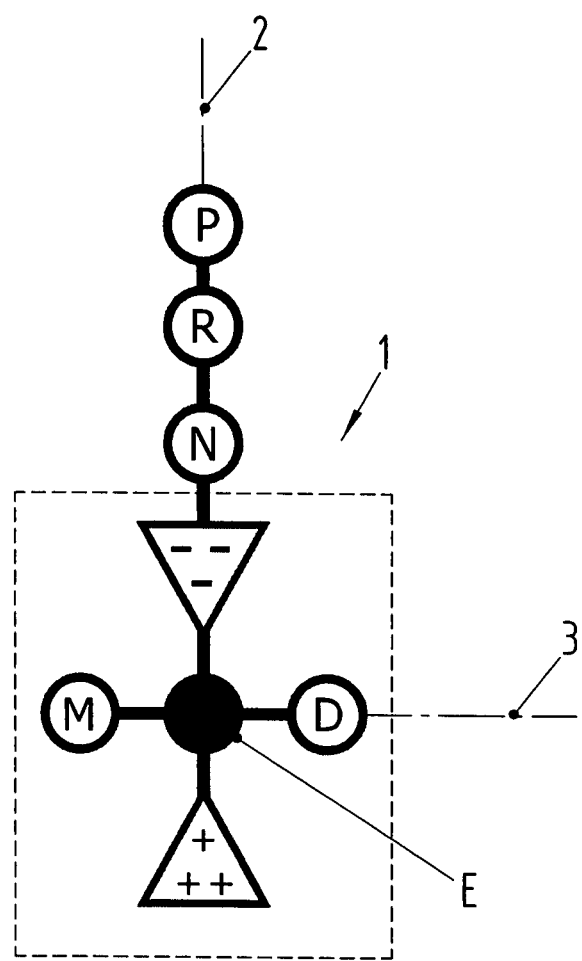
Figure 2:
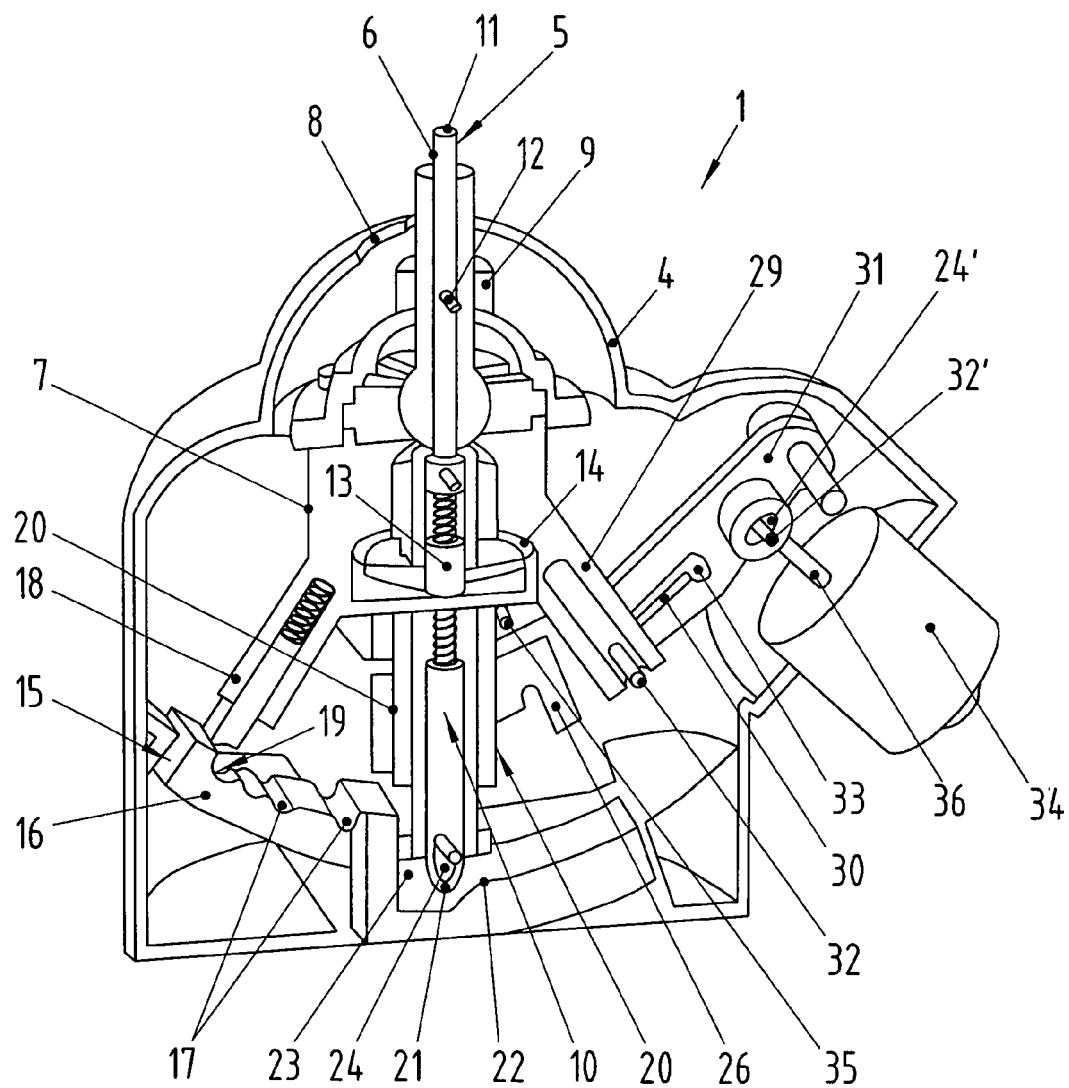
Figure 3:
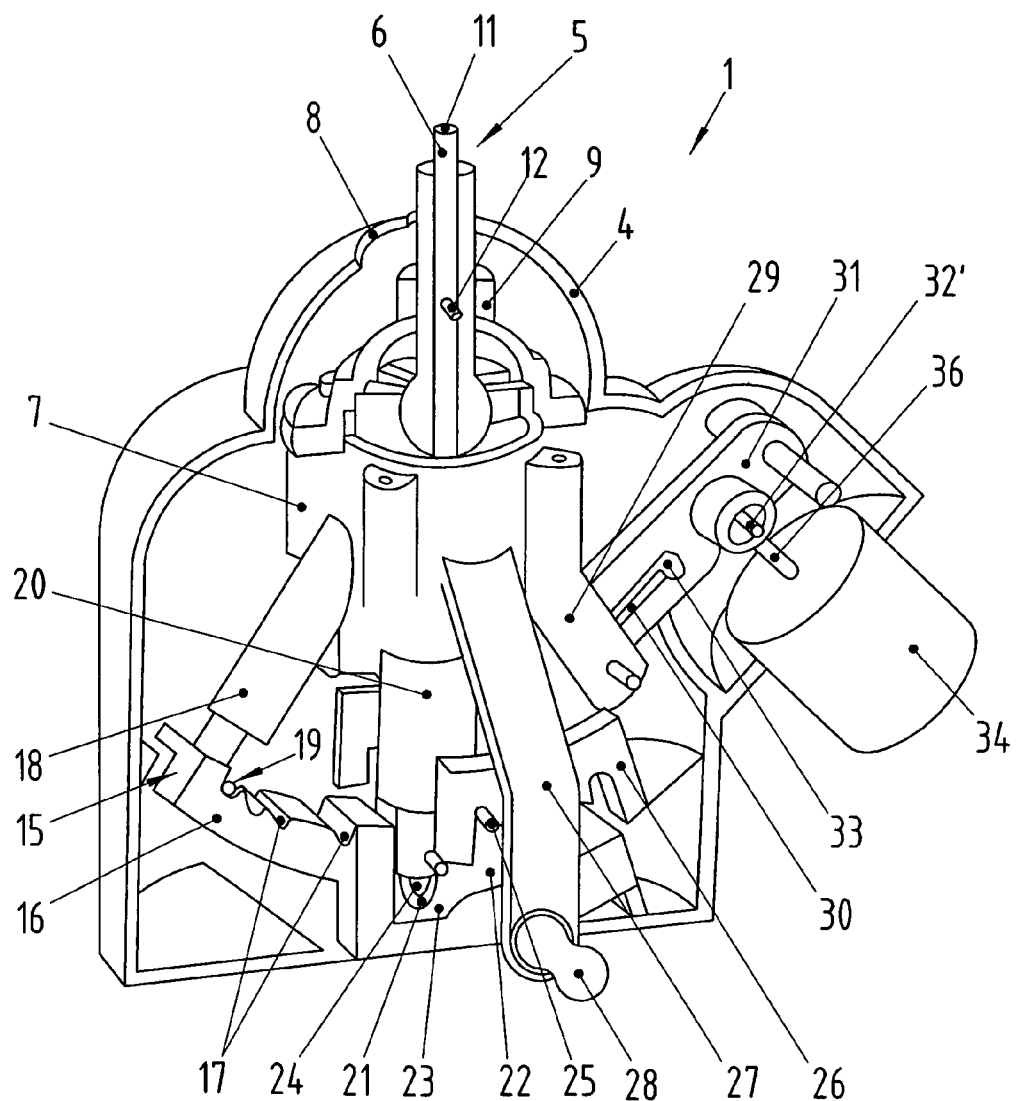

FIG. 1 schematically shows a selection pattern of the shifting device according to the present invention, FIG. 2 schematically shows a cross section through the shifting device according to the present invention, and FIG. 3 schematically shows a view as in FIG. 2, but with a cross section of the shift body.

DETAILED DESCRIPTION OF THE PREFERRED EMBODIMENTS

According to FIG. 1, a shift pattern of a shifting device 1 according to aspects of the present invention has a shift gate 2 as well as a transverse gate 3 that is arranged transversely thereto. A total of four stable selector lever positions, namely P, R, N and E, as well as two unstable selector lever positions + and − for the gradual or multiple upshifting and downshifting of the gears are arranged in alignment in the shift gate 2. The selector lever position P stands for inserting a parking brake or for a parking position. The stable selector lever position R designates a reverse gear, while the stable selector lever position N stands for a neutral position, i.e., for the interruption of the transmission of torque in the transmission (idling). The selector lever position E is inserted in driving operation, whereby a manual shifting or an automatic shifting of the gears can be selected directly from the selector lever position E. The stable selector lever position E is arranged in the shift gate 2 in alignment with the other stable selector lever positions P, R and N and at the same time is placed between two tapping positions +, − for gradual or multiple shifting, which are unstable and are arranged in alignment with the selector lever positions P, R and N. A plus stands for a simple upshifting of the gears, while a plus-plus stands for a multiple upshifting of the gears. The minus or double minus logically stands for a simple downshifting and a multiple downshifting, respectively. At the same time, the stable selector lever position E lies in the transverse gate 3, which runs transversely to the shift gate 2, between the two unstable selector lever positions D and M, which are arranged in the transverse gate 3 and which stand for drive, i.e., an automatic shifting of the gears and manual, i.e., a manual shifting of the gears. According to this, four unstable selector lever positions can be selected directly from the stable selector lever position E. Thus, the stable selector lever position E is also embodied as a stable middle position.

The shifting device 1 according to aspects of the present invention offers the great advantage that for a normal driving operation, i.e., during the forward driving of the vehicle, all possible shifting processes can be controlled directly from the middle position, i.e., from the stable selector lever position E. Thus, e.g., it is possible, after a light tapping to the left, to change into the M mode, i.e., into the manual shifting operation and as a result to upshift or downshift via the two unstable selector lever positions +/− arranged in the shift gate 2. To achieve an automatic shifting of the gears, a selector lever 5 only has to be tapped or moved slightly to the right into the unstable selector lever position D.

A possible design of the shifting device 1 based on FIGS. 2 and 3 shall be explained briefly below:

According to FIG. 2, the shifting device 1 has a housing 4, which surrounds a shifting mechanism contained in it. The selector lever 5, especially a manual selector lever, which comprises a selector shaft 6 and a shift body 7 that can be coupled thereto, is provided for selecting the different gears or shift positions. The selector lever 5 protrudes from the housing 4 via an opening 8 and it preferably has a handle for the manual actuation of the selector lever 5 at one end, not shown and facing away from the shifting device 1.

A first locking device 9 is assigned to the selector shaft 6, while a second locking device 10 is assigned to the shift body 7. The first locking device 9 couples or uncouples the selector shaft 5 from the shift body 7, while the second locking device 10 locks the shift body 7 or secures it against adjustment. When the first locking device 9 is unlocked, the selector shaft 6 is uncoupled from the shift body 7 in such a way that it is pivotable about a pivot axis (not shown), and the four unstable selector lever positions +/−, D, M can be controlled (cf. FIG. 1). On the other hand, when the first locking device 9 is locked, the selector shaft 6 is coupled to the shift body 7 in such a way that it is pivotable about the pivot axis together with the shift body 7 when the second locking device 10 is unlocked at the same time and, as a result, the stable selector lever positions P, R, N and E can be controlled. The first locking device has a spring-loaded pressure member 11, for example, a push rod, which is arranged within the selector shaft 6 and, in the pressed state, adjusts a first pin 12 in such a way that the first locking device 9 is consequently unlocked and the selector shaft 6 is uncoupled from the shift body 7.

At the end facing away from the handle of the selector lever 5, the selector shaft 6 has a spring-loaded slide pin 13, which is guided in a first shifting gate 14 or cooperates with same. In the position shown in FIG. 2, the selector lever 5 is in the stable selector lever position E, whereby the selector shaft 6 is uncoupled from the shift body 7. By means of the uncoupling, the selector shaft 6 is allowed four degrees of freedom of motion, namely into the positions D and M and the tapping positions +/− arranged transversely thereto for gradual or multiple shifting. In this case, the slide pin 13 moves within the shifting gate 14 in four different directions, which is preferably detected by a sensor and is forwarded to a transmission control or the transmission itself. The first shifting gate 14 is integrated into the shift body 7 according to FIG. 2.

To be able to change between the stable selector lever positions P, R, N and E, as mentioned above, the first locking device 9 has to be locked and the second locking device 10 has to be unlocked, so that the selector shaft 6 together with the shift body 7 are pivotable about the pivot axis. The exactly defined positions of the respective stable selector lever positions P, R, N and E are preset here by a second shifting gate 15, which has corresponding recesses 17 in a first shifting gate area 16 and, as a result, signals a reaching and/or exceeding of the stabile selector lever positions P, R, N and E in a tactile manner. Here, a first arm 18 of the shift body 7 cooperates with the first shifting gate area 16 of the second shifting gate 15 via a prestressed roller 19, which is arranged on the end at this shift body and against the second shifting gate 15. In case of an exceeding of the first shifting gate area 16 of the second shifting gate 15, the prestressed roller 19 meshes with the recesses 17 and, as a result, signals the reaching of the respective stable selector lever position to the driver.

A second arm 20 of the shift body 7 carries a prestressed axle pin 21, which cooperates with a second shifting gate area 22 of the second shifting gate 15. The second shifting gate area 22 has a depression 23, with which the axle pin 21 meshes upon reaching the stable selector lever position E. In case of an adjustment of the shift body 7 from the stable selector lever position E into any other stable selector lever position, the axle pin 21 comes out of the depression 23 and is pressed along a longitudinal hole 24 in the direction of the first shifting gate 14. Consequently, an adjustment of the selector shaft 6 into the unstable selector lever positions +/−, D, M is eliminated. Furthermore, the second arm 20 carries a locking pin 25 (cf. FIG. 3), which cooperates with a third shifting gate 26 and locks the shift body 7 in the respective stable selector lever positions P, R, N and E. The third shifting gate 26 carries recesses 17' similar to the first shifting gate area 16 of the second shifting gate 15.

A third arm 27 of the shift body 7 (cf. FIG. 3) carries a selector pull terminal 28, which transmits a change between the stable selector lever positions to the transmission or a transmission control. Finally, another, fourth arm 29 is arranged at the shift body 7, which cooperates with a locking shifting gate 30 of a locking lever 31 or has a pin 32, which is guided in the locking shifting gate 30. The locking lever 31 is mounted pivotably at the housing 4 of the shifting device 1 and has at least two self-locking locked positions in its locking shifting gate, one of which is designated as locked position 33.

To actuate or to pivot the locking lever 31, an actuator 34 is provided, which locks the locking lever 31 in the selector lever position N in the energized state, while it locks the locking lever 31 in the selector lever position P in the currentless state. The actuator 34 has a control pin 36 with a longitudinal hole 24' on the end, in which a pin 32' of the locking lever 31 is guided. With this, an effective securing against an operating error is given by means of a so-called key/shift-lock system.

To detect the respectively selected positions of the shift body 7 and the selector shaft 5, a plurality of sensors 35 are provided, one of which is shown, which forward a corresponding signal via a power supply to the transmission control upon reaching the respective selector lever position. Of course, sensors for detecting the respective unstable selector lever position may also be arranged in the first shifting gate 14.

In summary, the shifting device 1 according to aspects of the present invention thus provides a shift pattern, in which all the stable selector lever positions P, R, N and E are arranged in alignment in a shift gate 2, and, moreover, the stable selector lever position E is arranged, on the one hand, between two unstable selector lever positions +/− arranged in the shift gate 2 for manually upshifting and downshifting the gears and, on the other hand, between the two unstable selector lever positions D and M. The shifting device 1 according to aspects of the present invention has a selector lever 5, which comprises at least one selector shaft 6 and a shift body 7 that can be coupled thereto for controlling the stable selector lever positions P, R, N and E and the unstable selector lever positions +/−, M, D. To select the stable selector lever positions P, R, N, E, the selector shaft is coupled to the shift body 7, whereas it is uncoupled from the shift body 7 when the unstable selector lever positions +/−, M, D are selected.

The invention claimed is:

1. A shifting device for an automated or automatic transmission of a motor vehicle having a manual selector lever that can be moved into the following selector lever positions:
   a stable selector lever position P for engaging a parking brake,
   a stable selector lever position R for engaging a reverse gear,
   a stable selector lever position N for interrupting a transmission of torque in the transmission, whereby the selector lever positions P, R and N are arranged in alignment in a shift gate along a common linear axis,
   a selector lever position D that corresponds to an automatic shifting program including a forward gear,
   a selector lever position M that corresponds to manually triggerable shifting including upshifting and downshifting, and
   a stable selector lever position E that is positioned in alignment with the selector lever positions P, R and N in the shift gate along the common linear axis, wherein stable selector lever position E lies in the shift gate between two tipping positions that are unstable and are arranged in alignment along the common linear axis with the selector lever positions P, R and N, for gradual or multiple shifting including upshifting and downshifting, and
   wherein said stable selector lever position E lies between the two unstable selector lever positions D and M in a transverse gate, said transverse gate running transversely to the shift gate.

2. The shifting device in accordance with claim 1,
   wherein the selector lever comprises a selector shaft and a shift body that can be coupled thereto, and/or
   wherein a first locking device is assigned to the selector shaft and a second locking device is assigned to the shift body, and/or
   wherein when the first locking device is unlocked, the selector shaft is uncoupled from the shift body such that the selector shaft is pivotable about a pivot axis, while, when the first locking device is locked, the selector shaft is coupled to the shift body such that the selector shaft is pivotable about the pivot axis together with the shift body when the second locking device is unlocked at the same time, and/or
   wherein the first locking device includes a spring-loaded pressure member that is arranged in the selector shaft and is configured to unlock the first locking device in a pressed state to uncouple the selector shaft from the shift body.

3. The shifting device in accordance with claim 2, wherein when the selector shaft is uncoupled from the shift body, the stable selector lever position E, the two tipping positions, and the unstable selector lever positions M, D are shiftable, while the stable selector lever positions P, R and N are shiftable with the shift body.

4. The shifting device in accordance with claim 2,
   wherein the selector shaft has a spring-loaded slide pin on a shifting device side of the selector shaft that is guided in a first shifting gate, and/or
   wherein the first shifting gate of the selector shaft allows four degrees of freedom of motion into the positions D and M and the tipping positions, which are arranged transversely with respect to the positions D and M, for gradual or multiple shifting including upshifting and downshifting, and/or
   wherein, in a locked state, the first locking device blocks the four degrees of freedom of motion, and/or
   wherein the first shifting gate is integrated into the shift body.

5. The shifting device in accordance with claim 2,
   wherein a second shifting gate is provided that is configured to (i) preset the stable selector lever positions P, R, N and E with a first shifting gate area, and (ii) signal a reaching and/or exceeding of the stabile selector lever positions P, R, N and E in a tactile manner, and/or
   wherein a first arm of the shift body carries a prestressed roller that cooperates with the first shifting gate area of the second shifting gate, and/or
   wherein a second arm of the shift body carries a prestressed axle pin that cooperates with a second shifting gate area of the second shifting gate, and/or
   wherein the second arm of the shift body carries a locking pin that cooperates with a third shifting gate and locks the shift body in a stable selector lever position.

6. The shifting device in accordance with claim 5, wherein a third arm of the shift body carries a selector pull terminal that transfers a change in the stable selector lever positions to the transmission.

7. The shifting device in accordance with claim 6,
wherein a fourth arm of the shift body carries a pin that cooperates with a locking shifting gate of a locking lever, and/or
wherein the locking lever is mounted pivotably at a housing of the shifting device, and/or
wherein an actuator is provided, which actuates the locking lever for pivoting, such that in an energized state, the actuator locks the locking lever in the selector lever position N, while, in a currentless state, the actuator locks the locking lever in the selector lever position P.

8. The shifting device in accordance with claim 1, wherein at least one sensor is provided that detects the reaching of at least the stable selector lever positions P, R, N and E and sends corresponding electrical signals to a transmission control.

\* \* \* \* \*

UNITED STATES PATENT AND TRADEMARK OFFICE
CERTIFICATE OF CORRECTION

PATENT NO.        : 8,683,888 B2                                                     Page 1 of 1
APPLICATION NO.   : 12/375322
DATED             : April 1, 2014
INVENTOR(S)       : Sickart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1466 days.

Signed and Sealed this

Twenty-ninth Day of September, 2015

Michelle K. Lee
*Director of the United States Patent and Trademark Office*